United States Patent
Ranta et al.

(10) Patent No.: US 11,016,551 B2
(45) Date of Patent: May 25, 2021

(54) THERMAL ROTATION OF POWER SUPPLY PHASES

(71) Applicant: Microsoft Technology Licensing, LLC, Redmond, WA (US)

(72) Inventors: Steven William Ranta, Cle Elum, WA (US); William Paul Hovis, Sammamish, WA (US); Andres Felipe Hernandez Mojica, Seattle, WA (US); Rich Tat An, Renton, WA (US); Garrett Douglas Blankenburg, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 16/369,172

(22) Filed: Mar. 29, 2019

(65) Prior Publication Data
US 2020/0310519 A1  Oct. 1, 2020

(51) Int. Cl.
*G06F 1/32*  (2019.01)
*G06F 1/3215*  (2019.01)
*G06F 1/3234*  (2019.01)
*G06F 1/3296*  (2019.01)
*G06F 1/3203*  (2019.01)

(52) U.S. Cl.
CPC ............ *G06F 1/3215* (2013.01); *G06F 1/325* (2013.01); *G06F 1/3203* (2013.01); *G06F 1/3296* (2013.01)

(58) Field of Classification Search
CPC ....... G06F 1/3215; G06F 1/325; G06F 1/3296
USPC .......................................................... 713/320
See application file for complete search history.

(56) References Cited

U.S. PATENT DOCUMENTS

| | | | |
|---|---|---|---|
| 9,899,838 B2* | 2/2018 | Elasser | H02M 5/2573 |
| 9,921,624 B1* | 3/2018 | Okamura | G06F 1/206 |
| 10,608,539 B1* | 3/2020 | Huang | H02M 3/073 |
| 10,666,279 B1* | 5/2020 | Schurmann | H03M 1/162 |
| 2011/0115447 A1* | 5/2011 | Lin | H02M 3/1584 323/234 |
| 2012/0091815 A1* | 4/2012 | Richards, III | G06F 1/189 307/80 |
| 2014/0117518 A1* | 5/2014 | Fernando | H01L 23/49541 257/666 |
| 2015/0207400 A1* | 7/2015 | Shenoy | H02M 3/1584 323/213 |
| 2016/0141950 A1* | 5/2016 | Goth | H02M 3/285 363/65 |

(Continued)

FOREIGN PATENT DOCUMENTS

EP        3399633 A1    11/2018

OTHER PUBLICATIONS

"International Search Report and Written Opinion issued in PCT Patent Application No. PCT/US20/023475", dated Jun. 15, 2020, 11 Pages.

*Primary Examiner* — Volvick Derose

(57) ABSTRACT

Power supply circuitry and enhanced associated techniques are presented herein. In one example, a method includes powering a circuit with a plurality of power supply phases, and monitoring thermal properties of the plurality of power supply phases. Responsive to the thermal properties indicating at least one of the plurality of power supply phases exceeds a thermal threshold, the method includes selecting a dormant power supply phase to supplant the at least one of the plurality of power supply phases.

15 Claims, 5 Drawing Sheets

(56) References Cited

U.S. PATENT DOCUMENTS

2017/0163028 A1\* 6/2017 Kilroy ................. H02H 1/0023
2018/0316255 A1\* 11/2018 Tang .................... H02M 3/158

\* cited by examiner

THERMAL ROTATION OF POWER SUPPLY PHASES

BACKGROUND

Integrated circuits, such as processor devices and peripheral circuitry employed in computing systems, consume electrical power which is supplied by accompanying power supply components. Power consumption in these integrated circuits can have a substantial power budget, which is allocated to main processors, graphics processors, or system-on-a-chip (SoC) elements. Although much of this power is consumed in the associated integrated circuits, the power supply components themselves can also consume a portion of the total power. The amount of power consumed within power supply components is largely correlated to the efficiency of such components. Power consumption within power supply components typically results in temperature increases within the individual components, such as in passive components, power conversion circuitry, power regulators, and the like. When these components rise in temperature, associated efficiencies and reliability can be reduced, and failures can result. Many times, oversized electrical components are included to attempt to reduce the effects of temperature rise, which can lead to increased cost, size, weight, and complexity.

OVERVIEW

Power supply circuitry and enhanced associated techniques are presented herein. In one example, a method includes powering a circuit with a plurality of power supply phases, and monitoring thermal properties of the plurality of power supply phases. Responsive to the thermal properties indicating at least one of the plurality of power supply phases exceeds a thermal threshold, the method includes selecting a dormant power supply phase to supplant the at least one of the plurality of power supply phases.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
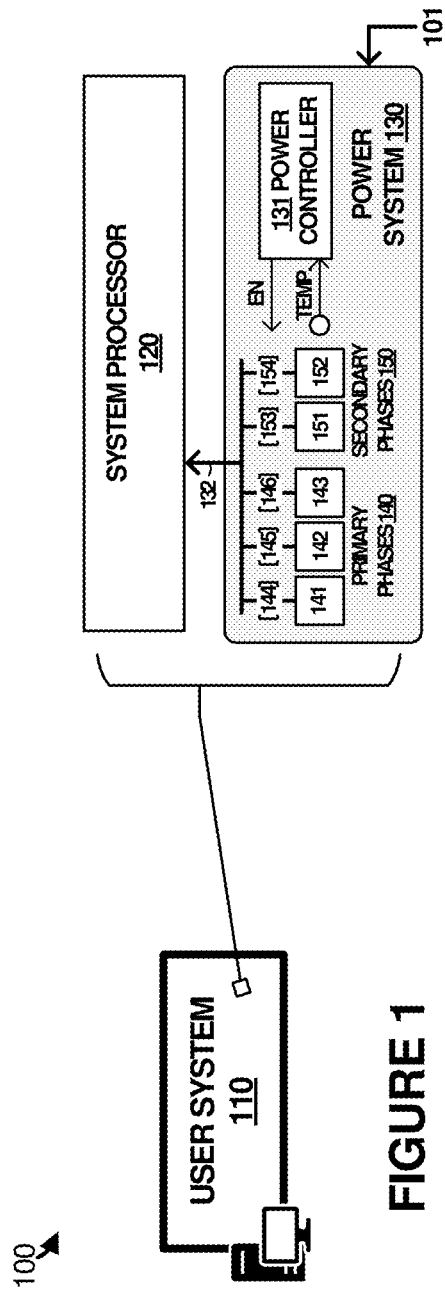
FIG. 1 illustrates a computing environment in an implementation.

Power consumption in computing devices, such as computers, laptops, tables, servers, smartphones, gaming machines, and the like, can have a substantial power budget allocated to a main processor or system-on-a-chip (SoC) elements. Power consumption levels in modern integrated computing devices tend to increase as performance requirements increase. Power supply components are included in these computing devices to convert voltage levels from input sources as well as manage power distribution to the individual integrated circuits. Computing devices can also include more than one voltage domain that segregates power consumption among particular integrated circuits or portions of the same integrated circuits, such as for processing cores or graphics cores each having corresponding supply voltage requirements.

During the process of supplying power to associated integrated circuits, power supply components themselves can also consume a portion of the total power. The amount of power consumed within power supply components is largely correlated to the efficiency of such components. Power consumption within power supply components typically results in temperature increases within the individual components, such as in passive circuit components, power conversion circuitry, power regulators, and the like. When these components rise in temperature, associated efficiencies and reliability can be reduced, and failures can result.

Power consumption in computing devices, such as computers, laptops, tables, servers, smartphones, gaming systems, and the like, can vary significantly from low levels to high levels depending on a presently executing application or present power state. Power supplies can be designed for the highest efficiency at the maximal load. However, with dynamic loads, such as processors in computing devices, the electrical load presented to the power supply may be relatively low during idle processing or execution timeframes. In this case, turning off supply phases (referred to herein as making dormant) may allow a higher efficiency in the power supply conversion processes. Controlling efficiency can result in controlling excess temperature rise in the computing device, which enhances component reliability, lowers operating costs, and if the device is battery operated, increases operation times between battery recharging.

Voltage conversion circuitry, such as voltage regulators, AC-DC converters, DC-DC converters, and other similar circuitry, can use individual "phases" which effectively split the associated output current into several groups. These configurations are referred to as multiphase power supplies. Multiphase power supplies use a plurality of power supply phases to share the burden of a common large electrical load and maintain higher efficiency in each power supply phase. A higher quantity of phases corresponds to less current handled by each individual phase, while a smaller quantity of phases corresponds to a higher current handled by each individual phase. Typically, a common electrical load is dynamic in operation (e.g. a processor), and if the common electrical load decreases a demand for current, then operating a current quantity of power supply phases may be inefficient. Therefore, some power supply phases may be turned off and made dormant to reduce associated power consumption.

As mentioned above, an amount of current handled by a particular phase can correspond to a power consumption in power supply components. Thus, increasing a quantity of phases can lower operating currents per-phase. However, each of the phases typically has thermal requirements which should not be exceeded to operate reliably over the lifetime of the product, such as maximum junction temperatures in transistor-level circuitry of the power conversion circuitry. When power requirements for supplied devices and circuitry are high, heat sinks are usually employed in power conversion circuitry to stay at or below specified junction temperatures. These heat sinks are effective but can be very expensive and bulky. To provide for reduced size and cost, as well as enhanced operation of multiphase power supply circuitry, the enhanced examples and techniques discussed herein correspond to using dormant phases that can be rotated into active service as current demand increases or temperature increases in power supply components.

For example, a multiphase power supply design initially having a first set of power supply phases can have additional phases added which remain dormant or inactive. These additional phases can reduce cost and size associated with adding heat sinks or active cooling components (e.g. fans), while providing for operation of the first set of power supply phases below a temperature threshold. Control circuitry can track temperatures of all phases and use only the phases that are below a desired junction temperature. As a phase starts getting close to a target temperature threshold limit, such as a maximum junction temperature, then an alternate dormant phase can be brought into service. In other examples, a rotation among phases in and out of service can provide sufficient current to the load while keeping the associated power supply phase temperatures below target levels using a duty cycling technique to supply current demand across the phases over a thermally-relevant time constant. Advantageously, the enhanced power supply circuitry discussed herein can maintain higher power supply efficiencies over an operating current range of a dynamic load while having lower thermal dissipations in each active power supply phase.

Turning now to the various examples shown in the included drawings, FIG. 1 is presented which illustrates a computing environment in an implementation. Specifically, FIG. 1 includes computing environment 100. Environment 100 includes user system 110, which further includes system processor 120 and power system 130. Further example systems and elements which can implement the features discussed for user system 110 are included in at least FIG. 3 and FIG. 5 below.

User system 110 comprises a computing system or computing assembly, such as a computer, server, tablet device, laptop computer, smartphone, gaming system, entertainment system, storage system, or other computing system, including combinations thereof. User system 110 includes several components detailed in FIG. 1. These components include system processor 120 and power system 130. Furthermore, user system 110 can include assembly elements, namely enclosure elements, thermal management elements, memory elements, storage elements, communication interfaces, and graphics elements, among other elements. When system processor 120 is installed in user system 110, these assembly elements provide system resources and context for the operation of system processor 120. System processor 120 can comprise one or more integrated circuit elements, such as processor cores, cache memory, communication interfaces, graphics cores, and north bridge elements, among other integrated elements not shown for clarity.

Power system 130 comprises a multiphase power supply and includes power controller 131, primary power phases 140, and secondary power phases 150. The total quantity of primary power phases and secondary power phases can vary by implementation. While the quantity of primary power phases is typically related to the current load, an arbitrary quantity of secondary power phases might be employed. Elements of power system 130 might be replicated a number of times to provide several voltages for system processor 120 or multiple system processors, such as when system processor 120 requires different voltages applied to different voltage domains. A separate instance of power system 130 might be employed for each voltage domain, with some control elements optionally shared among instances. Power system 130 receives power from an external source, such as from batteries or an external power source, and converts/regulates the power to produce voltages and currents to operate the elements of user system 110. In FIG. 1, power system 130 converts an input power source 101 into one or more supply voltages. Power system 130 provides at least one supply voltage to system processor 120 over power link 132. Power controller 131 can control one or more voltage domains, and each voltage domain can have a plurality of power supply phases. System processor 120 can then boot into an operating system (OS) once provided with one or more supply voltages to execute various operations of user system 110 including user applications, communication services, storage services, gaming services, or other features of a computing system.

Multiphase power supplies, such as power system 130, can have a master-slave relationship among the phases. In FIG. 1, such an arrangement might employ one of the primary phases as a master, with the rest of the phases (dormant or not) supporting the load at link 132. Although some implementations have a master phase as a predetermined or fixed phase, the examples herein can dynamically select a master phase on-demand based on thermal information, with the rest of the phases assigned as slave phases. Although this master phase might be selected dynamically based on a phase having a lowest temperature among the other phases, various other factors can be employed in this selection. In the discussion herein, a set of primary phases refers to presently active phases, which also includes a master phase and one or more active slave phases. A set of secondary phases refers to presently inactive or dormant phases comprising slave phases. Some of the secondary phases may not yet be available for use as an active phase, such as when dormancy timeouts are employed. However, for clarity in the discussion, the groups or sets of active/dormant phases will be referred to below as primary/secondary phases and it should be understood that the master-slave arrangement might be concurrently present among various phases as well.

Power controller 131 can comprise one or more microprocessors and other processing circuitry that retrieves and executes software or firmware, such as power phase control firmware, from an associated storage system. Power controller 131 can be implemented within a single processing device but can also be distributed across multiple processing devices or sub-systems that cooperate in executing program instructions. Examples of power controller 131 include general purpose central processing units, application specific processors, and logic devices, as well as any other type of processing device, combinations, or variations thereof. In some examples, power controller 131 comprises an Intel® or AMD® microprocessor, ARM® microprocessor, FPGA, ASIC, application specific processor, or other microprocessor or processing elements.

Primary power phases 140 and secondary power phases 150 typically include voltage regulator circuitry, controller circuitry, power filtering elements, power conditioning elements, power conversion elements, power electronics elements, or other power handling and regulation elements. Primary power phases 140 comprises phases 141-143 and supply power to system processor over power link 132. Secondary power phases 150 supplement operation of primary power phases 140. Specifically, one or more among phases 151-152 can be activated or inactivated to supplement or supplant one or more among phases 141-143 according to thermal properties of phases 141-143. Power system 130 includes power controller 131 to control operations of primary power phases 140 and secondary power phases 150. Power controller 131 can monitor temperatures or other thermal properties of each of primary power phases 140 and secondary power phases 150. Power controller 131 can enable/disable individual ones of primary power phases 140 and secondary power phases 150. Power controller 131 can enable or disable any phase, in any order, to achieve a target efficiency and thermal temperature rise of power system 130.

Figure 2:
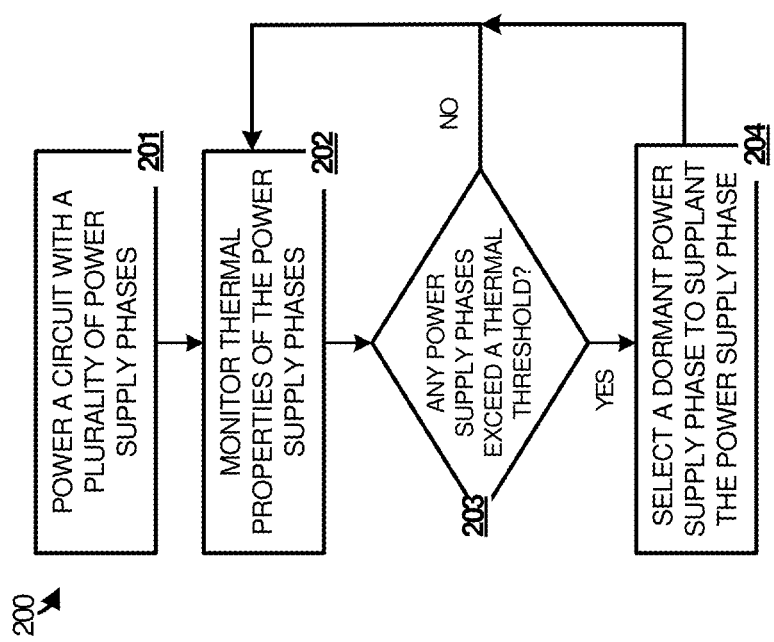
FIG. 2 illustrates a method of operating a power supply system in an implementation.

FIG. 2 is included to illustrate operation of an enhanced power supply system. Specifically, FIG. 2 is a flow diagram illustrating a method of operating elements of environment 100 in an implementation. In FIG. 2, power system 130 powers (201) a circuit with a plurality of power supply phases. In this example, the circuit comprises system processor 120, although other circuits and elements of user system 110 can be powered by power system 130.

Also, power system 130 comprises a plurality of power supply phases, namely primary power phases 140 and secondary power phases 150. Power phases 140 include phases 141-143, while power phases 150 include phases 151-152. A different quantity of power phases can be included in other examples. In operation, primary power phases 140 are employed to provide power to system processor 120 over link 132. Secondary power phases 150 remain dormant or inactive until power controller 131 enables one or more among secondary power phases 150. Power controller 131 can enable or disable any of primary power phases 140 and secondary power phases 150 according to the various criteria discussed herein, such as thermal criteria.

Each phase in FIG. 1 can provide a portion of the total power supplied to system processor 120 over link 132. For example, when three primary power phases 141-143 are active, each can provide approximately ⅓ of the total power supplied to system processor 120. The total power can refer to a power in Watts dissipated by system processor 120, or might instead refer to a current in Amperes supplied over link 132. Although each of primary power phases 141-143 generally supply ⅓ of the total power/current to system processor 120, individual variations and circuit properties might lead to differences among the current provided by each phase. This can lead to asymmetric heating among primary power phases 141-143, or might instead lead to each of primary power phases 141-143 heating at different rates. It should be understood that primary power phases 141-143 might experience similar or more symmetric heating in some examples.

As shown in FIG. 1, primary power phases 140 and secondary power phases 150 couple to link 132. However, various circuitry can be employed between each phase output and link 132, such as to control coupling/decoupling of the associated phases from link 132. This circuitry is shown as circuit elements 144-146 and 153-154. Circuit elements 144-146 and 153-154 can comprise diodes, analog switches, transistor-controlled coupling elements, power transistors, or other circuitry. Moreover, as mentioned above, primary power phases 140 and secondary power phases 150 each can include not only power conversion circuitry by various monitoring circuitry as well. This monitoring circuitry can include temperature monitoring circuitry which can provide current temperature information or thermal properties to power controller 131.

Power controller 131 monitors (202) thermal properties of the power phases, such as thermal information or temperature properties provided by each of primary power phases 141-143 and secondary phases 151-152. Individual links might be employed to transfer this thermal information, or a shared data bus can be employed, such as system management bus (SMB) interfaces, inter-integrated circuit (I2C or IIC) interfaces, or other similar control links. Temperature monitoring circuitry might be integrated into power handling elements of primary power phases 141-143 and secondary phases 151-152, such as within integrated control circuitry, power transistors, or other similar circuitry.

Power system 130 can establish one or more temperature thresholds which are used to control operation of primary power phases 141-143 and secondary phases 151-152. A first temperature threshold might include an upper thermal threshold used to trigger changes in which of primary power phases 141-143 and secondary phases 151-152 are enabled or disabled. A second temperature threshold might include a lower thermal threshold used to indicate when any of primary power phases 141-143 and secondary phases 151-152 can be brought into service.

Power controller 131 thus compare thermal properties of each of power phases to determine (203) if any power phases exceed a thermal threshold. In this case, the thermal threshold refers to the upper thermal threshold which indicates that any of the active power phases is reaching a temperature level over the thermal threshold. If no phases are presently exceeding the thermal threshold, then power controller 131 continues to monitor associated thermal properties for any later temperature excesses. However, if any of the active power phases are presently exceeding the thermal threshold, then power controller 131 can perform one or more responsive actions.

In one example, power controller 131 selects (203) a dormant power phase to supplant the power phase which is exceeding the thermal threshold. For this example, assuming primary power phase 141 is exceeding the thermal threshold, then any of the dormant or inactive secondary power phases 151-152 can be brought into service by power controller 131. This dormant power phase can be activated, powered-on, enabled, or otherwise brought into an active state which converts input power to a desired voltage of link 132. Moreover, this dormant power phase might be coupled to link 132, such as via one or more switchable elements.

The supplementation by the dormant power phase can take two forms. In a first example, the dormant power phase is added to the active quantity of primary power phases 140 while primary power phase 141 (which exceeds the thermal threshold) remains active or in-service. This can allow each phase of primary power phases 140 to handle a smaller portion of the total current supplied to system processor 120, which can lead to lower thermal performance for each phase. However, a second example might perform a different operation. This second example can add the dormant phase into the active quantity of primary power phases 140 while primary power phase 141 is removed from the active quantity of primary power phases 140.

In this manner, a 'pool' of active and dormant power phases can be maintained. Active power phases comprise those among primary power phases 141-143 and secondary phases 151-152 which are presently providing a portion of the current or power to system processor 120. Dormant power phases comprise those among primary power phases 141-143 and secondary phases 151-152 which are not presently providing a portion of the current or power to system processor 120. The dormant power phases might be disabled, inactivated, or decoupled from link 132, among other operations which place the dormant power phases out of service. As active ones of primary power phases 141-143 and secondary phases 151-152 reach or exceed the upper thermal threshold, then these phases can be brought out of service and placed into a dormancy state which allows the phases to cool down over time to at least below a lower thermal threshold or linger in the dormancy state until at least a dormancy period has expired. Thus, a power phase can be selected from a pool of dormant power supply phases as having a corresponding temperature below a dormancy temperature threshold or having been dormant for a corresponding dormancy period. Once the lower thermal threshold has been reached, then that phase can be brought into the pool of dormant power phases which might be activated again as-needed. Concurrently, one or more dormant power phases is brought into service from the pool to handle a portion of the current along with the other active power phases. The particular dormant power phase selected for active service might comprise one of the dormant power phases with the lowest present temperature, or might be selected based on a longest time of dormancy.

Advantageously, power phases can be disabled to prevent thermal properties from exceeding desired levels or tolerances to enhance reliability and operation of user system 110 while preventing any interruptions of power or current to system processor 120. Moreover, the pool of dormant power phases can be rotated among to ensure that dormant phases have had ample time to cool down below desired temperature levels after removal from service. This rotation among power phases in and out of service from a pool of power phases can provide sufficient current to system processor 120 while keeping the associated power phase temperatures below target levels using a duty cycling technique to supply current demand across the power phases over a thermally-relevant time constant.

Also, when current loads fall below threshold levels, such as during idle execution timeframes of system processor 120, temperature information of each phase can be used along with the current load information to enable/disable individual phases. For example, when the electrical load at link 132 does not require all phases to be in active operation, then thermal information can be employed by power controller 131 to select which phases should be active and which should be dormant. This thermal or temperature information can be employed in addition to, or alternatively from other forms of power phase selection. For example, electronic devices may employ a table which defines voltage and frequencies for different power states of the load device. Based on power, performance, or thermal characterization of the load device, the quantity of phases employed during each of the power states can be determined using the table.

Figure 3:
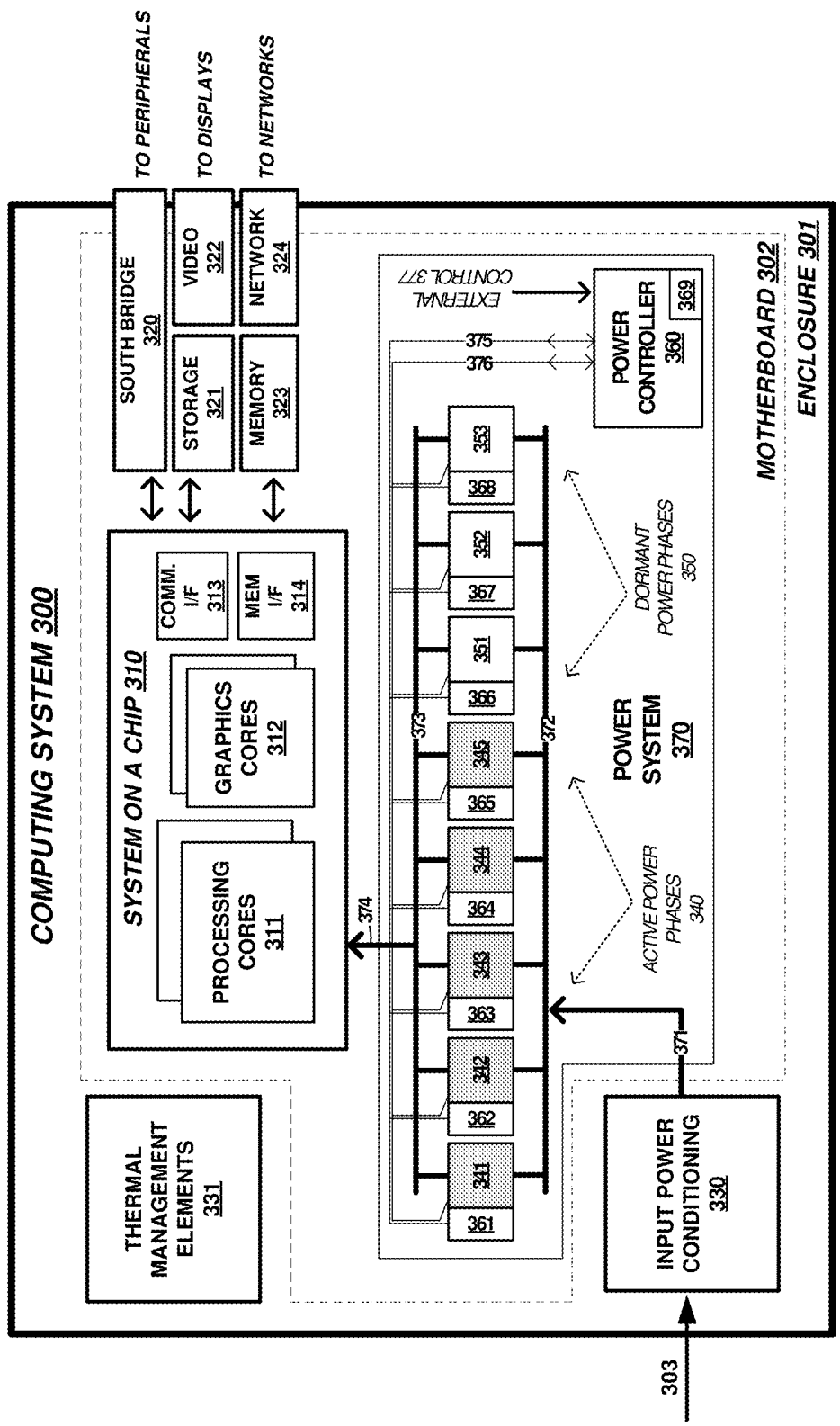
FIG. 3 includes a computing environment in an implementation.

As a further example of power supply circuitry within example computing environments and systems, FIG. 3 is presented. FIG. 3 illustrates computing system 300 that is representative of any system or collection of systems in which the various operational architectures, platforms, scenarios, and processes disclosed herein may be implemented. For example, computing system 300 can be used to implement user system 110 in FIG. 1, although variations are possible.

Examples of computing system 300 include, but are not limited to, a gaming console, smartphone, tablet computer, laptop, server, personal communication device, personal assistance device, wireless communication device, subscriber equipment, customer equipment, access terminal, telephone, mobile wireless telephone, personal digital assistant, personal computer, e-book, mobile Internet appliance, wireless network interface card, media player, or some other computing apparatus, including combinations thereof.

Computing system 300 may be implemented as a single apparatus, system, or device or may be implemented in a distributed manner as multiple apparatuses, systems, or devices. Computing system 300 includes, but is not limited to, enclosure 301, system on a chip (SoC) device 310, south bridge 320, storage system 321, video elements 322, memory elements 323, network module 324, input power conditioning circuitry 330, optional thermal management elements 331, and power system 370. Power system 370 includes active power phases 340, dormant power phases 350, and power controller 360. SoC device 310 is operatively coupled with the other elements in computing system 300, such as south bridge 320, storage system 321, video elements 322, memory elements 323, network module 324. SoC device 310 receives power over power link 374 as supplied by one or more among active power phases 340 and dormant power phases 350. One or more of the elements of computing system 300 can be included on motherboard 302, although other arrangements are possible.

Referring still to FIG. 3, SoC device 310 may comprise a micro-processor and processing circuitry that retrieves and executes software from storage system 321. Software can include various operating systems, user applications, gaming applications, multimedia applications, or other user applications. SoC device 310 may be implemented within a single processing device, but may also be distributed across multiple processing devices or sub-systems that cooperate in executing program instructions. Examples of SoC device 310 include general purpose central processing units, application specific processors, graphics processing units, and logic devices, as well as any other type of processing device, combinations, or variations thereof. In FIG. 3, SoC device 310 includes processing cores 311, graphics cores 312, communication interfaces 313, and memory interfaces 314, among other elements. Some of the noted elements of SoC device 310 can be included in a north bridge portion of SoC device 310.

Data storage elements of computing system 300 include storage system 321 and memory elements 323. Storage system 321 and memory elements 323 may comprise any computer readable storage media readable by SoC device 310 and capable of storing software. Storage system 321 and memory elements 323 may include volatile and nonvolatile, removable and non-removable media implemented in any method or technology for storage of information, such as computer readable instructions, data structures, program modules, or other data. Examples of storage media include random access memory (RAM), read only memory, magnetic disks, optical disks, flash memory, virtual memory and non-virtual memory, magnetic cassettes, magnetic tape, magnetic disk storage or other magnetic storage devices, or any other suitable storage media. Storage system 321 may comprise additional elements, such as a controller, capable of communicating with SoC device 310 or possibly other systems.

South bridge 320 includes interfacing and communication elements which can provide for coupling of SoC 310 to peripherals, user input devices, user interface devices, printers, microphones, speakers, or other external devices and elements. In some examples, south bridge 320 includes a system management bus (SMB) controller or other system management controller elements.

Video elements 322 comprise various hardware and software elements for outputting digital images, video data, audio data, or other graphical and multimedia data which can be used to render images on a display, touchscreen, or other output devices. Digital conversion equipment, filtering circuitry, image or audio processing elements, or other equipment can be included in video elements 322.

Network elements 334 can provide communication between computing system 300 and other computing systems (not shown), which may occur over a communication network or networks and in accordance with various communication protocols, combinations of protocols, or variations thereof. Example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Enclosure 301 can include various structural support elements, cases, chassis elements, or other elements that house and structurally support the further elements of computing system 300. Optional thermal management elements 331 can include heatsinks, fans, heat pipes, heat pumps, refrigeration elements, or other elements to manage and control temperature of enclosure 301 and computing system 300. Typically, thermal management elements 331 are included for SoC 310 or associated circuitry. In this example, power phases 340 and 350 may omit thermal management elements 331, such as heatsinks, due to the enhanced operation discussed herein.

Active power phases 340 and dormant power phases 350 can provide operating voltages at associated current levels to SoC device 310. In many examples, the conversion of power discussed herein comprises converting an input voltage of link 371 to a different output voltage or supply voltage on link 374, along with any related voltage regulation. Active power phases 340 and dormant power phases 350 comprise various power electronics, power controllers, DC-DC conversion circuitry, AC-DC conversion circuitry, gate modulation circuitry, power transistors, half-bridge elements, filters, passive components, and other elements to convert input power received through input power conditioning elements 330 over link 303 from a power source into voltages usable by SoC device 310.

Some of the elements of power system 370 might be included in input power conditioning 330. Input power conditioning 330 can include filtering, surge protection, electromagnetic interference (EMI) protection and filtering, as well as perform other input power functions for input power 303. In some examples, input power conditioning 330 includes AC-DC conversion circuitry, such as transformers, rectifiers, power factor correction circuitry, or switching converters. When a battery source is employed as input power 303, then input power conditioning 330 can include various diode protection, DC-DC conversion circuitry, or battery charging and monitoring circuitry.

Power controller 360 can instruct active power phases 340 and dormant power phases 350 to provide particular voltage levels for one or more voltage domains. Power controller 360 can instruct active power phases 340 and dormant power phases 350 to provide particular voltage levels for one or more operational modes, such as normal, standby, idle, and other modes. Active power phases 340 and dormant power phases 350 can each comprise switched-mode voltage circuitry or other regulation circuitry, such as DC-DC conversion circuitry.

The total quantity of active power phases and dormant power phases included in power system 370 can vary by implementation. While the quantity of active power phases is typically related to the current load, an arbitrary quantity of dormant power phases might be employed. Multiple instances of portions of power system 370 might be replicated a number of times to provide several voltages for system processor SoC 310, such as when SoC 310 requires different voltages applied to different voltage domains. A separate instance of active/dormant power phases might be employed for each voltage domain, with some control elements of power controller 360 optionally shared among instances. Also, multiphase power supplies, such as shown in FIG. 3, can have a master-slave relationship among the phases. In FIG. 3, such an arrangement might employ one of the active phases as a master, with the rest of the phases (dormant or not) supporting the load at link 374. Although some implementations have a master phase as a predetermined or fixed phase, the examples herein can dynamically select a master phase on-demand based on thermal information, with the rest of the phases assigned as slave phases.

Thermal monitoring elements 361-368 can be included in computing system 300 and associated with each of power phases 341-345 and 351-353. Thermal monitoring elements 361-368 can include one or more temperature sensors comprising thermocouples, silicon bandgap temperature sensors, thermistors, resistance temperature detectors (RTDs), other temperature sensing elements which indicate to SoC device 310 current temperatures associated with power phases 341-345 and 351-353 as well as the various elements of system 300, including inside of enclosure 301, outside of enclosure 301, or temperatures of SoC device 310.

Power controller 360 comprises processing elements configured to monitor temperatures of power phases 341-345 and 351-353 over link 375. Power controller 360 also comprises control circuitry configured to selectively enable or disable ones among power phases 341-345 and 351-353 over link 376. Power controller 360 can establish a pool of dormant power phases and a pool of active power phases and selectively exchange members of the pools based on monitored thermal properties. Power controller 360 can be included in elements of SoC device 310, or comprise discrete processing circuitry. Power controller 360 can receive instructions via external control link 377, which may comprise one or more programming registers, application programming interfaces (APIs), or other components. Power controller 360 can provide status over link 377, such as temperature status, active power phase status, dormancy pool member status, current/voltage level status, or other information.

Power controller 360 can comprise one or more microprocessors and other processing circuitry that retrieves and executes software or firmware, such as power phase control firmware and temperature monitoring firmware, from an associated storage system. Power controller 360 can be implemented within a single processing device but can also be distributed across multiple processing devices or subsystems that cooperate in executing program instructions. Examples of power controller 360 include general purpose central processing units, application specific processors, and logic devices, as well as any other type of processing device, combinations, or variations thereof. In some examples, power controller 360 comprises an Intel® or AMD® microprocessor, ARM® microprocessor, FPGA, ASIC, application specific processor, or other microprocessor or processing elements.

Figure 4:
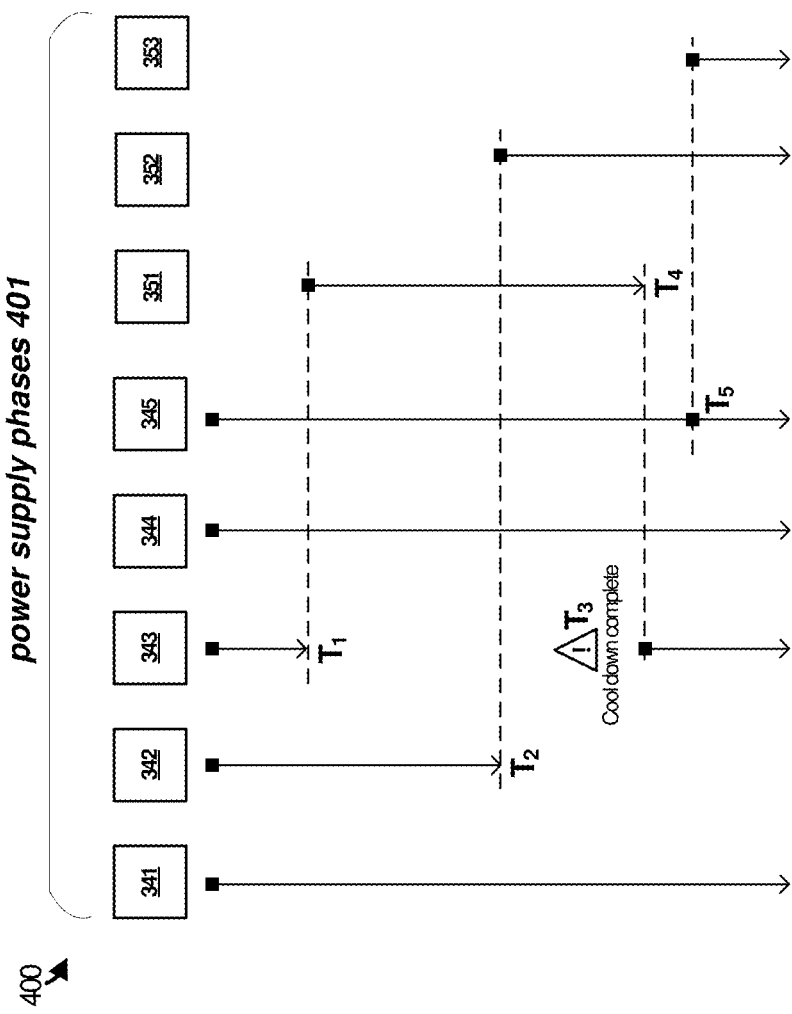
FIG. 4 illustrates a method of operating a power supply system in an implementation.

Turning now to an example operation of computing system 300 and power system 370, FIG. 4 is presented. FIG. 4 shows power phases 401 with regard to a present active or inactive status. An active status refer to a power phase being in an active state, in-service, or presently providing power to SoC 310. An inactive status can refer to a power phase being in an inactive state, out-of-service, or dormant. In FIG. 4, an initial subset of the plurality of power supply phases defined by active power phases 340 and dormant power phases 350 are active. Although this initial subset can vary, in FIG. 4 this initial subset includes active power phases 340 and associated power phases 341-345 which are configured to initially supply power to SoC 310 over link 374. Another subset of power supply phases is initially dormant, namely secondary power supply phases 350 which include power phases 351-353.

During operation, power controller 360 monitors thermal properties, such as operating temperatures, of each of the presently active power phases to determine when any of the presently active power phases meets one or more thermal criteria. For the examples discussed in FIG. 4, direct measurement of thermal properties is discussed, but other determinations of thermal properties can instead be employed. In other examples, instead of direct measurement of thermal properties, such as operating temperatures, indirect determinations of operating temperatures can be established by power controller 360. For example, currents supplied by each of the active power phases (along with associated voltage levels) can be effectively translated into thermal impact on each power phase. Power phases might be characterized during performance testing or based on component specifications to determine expected thermal behavior under various current/voltage configurations. These characterizations can be used to determine thermal properties of the components of the power phases during operation.

In this example, power phase 343 may experience a more rapid rise in operating temperature or exhibit a hotter running behavior. At time T1 in FIG. 4, the operating temperature provided by thermal monitoring element 363 to power controller 360 indicates that an operating temperature of power phase 343 has risen above a predetermined temperature threshold. This temperature threshold can be determined based on manufacturer specified operating temperatures for certain components of a power phase, or might be set to a different limit or threshold to satisfy reliability concerns. Responsive to thermal monitoring element 363 indicating that an operating temperature of power phase 343 has risen above the predetermined temperature threshold, power controller 360 disables power phase 343 and enables power phase 351 to supplant or otherwise operationally replace power phase 343. Power phase 351 thus operates to supply a portion of the total current to SoC 310 which was originally supplied by now-disabled power phase 343.

Power phase 343 is placed into a cool down phase but not yet into a pool of available dormant power phases. This cool down phase allows time for power phase 343 to meet one or more dormancy criteria. The dormancy criteria can include waiting for power phase 343 to reduce in temperature to below a predetermined dormancy temperature threshold. The dormancy temperature threshold can be determined based on an ambient temperature of computing system 300. The dormancy criteria can instead be based on a time-constant style of rotation among power phases. For example, power phase 343 might be placed into the cool down phase for a period of time which corresponds to a cyclic enable/disable operation. This cyclic operation allows for sufficient cool down time for power phase 343 to reach a target dormancy temperature before potentially being brought into active service. Once power phase 343 satisfies the selected dormancy criteria, then power phase 343 can be be placed into a dormancy pool of power phases that are ready to be activated when needed.

In examples where thermal properties are not monitored directly, a power-time value can be determined based on 'x' amount of power consumed in a particular power phase over 'y' amount of time. If this power-time value is greater than the other active phases, or this power-time value is greater than a predefined threshold, then the associated power phase can be rotated out of service and a dormant power phase rotated into service. In conjunction with rotating the phases based on a power-time value, dormant power phases can have a characterization indicated how long of a dormancy period or cool-down time is required to reach a threshold lower temperature before being brought into service. This characterization can be further enhanced with knowledge of a particular voltage level and operating frequency of the load device, such as for various voltage/frequency domains of SoC 310. Specifically, power phase rotation can be determined based on a power phase rotation cycle time (t) and the number of active power phases (n) as a function (f) which depends on the load device (e.g. SoC 310) operating voltage and operating frequency. A present quantity of power phases and/or a phase rotation cycle time can be calculated dynamically based on a voltage and/or frequency of the load device. For example, the number active power phases can be increased when a voltage/frequency of SoC 310 is increased. The power phase rotation cycle time can similarly also be a function dependent on operating voltage and operating frequency of SoC 310. In this example, the power phase count and active/inactive time periods can be calculated dynamically and on-the-fly as the load device changes operating voltages and frequencies.

At time T2 in FIG. 4, the operating temperature provided by thermal monitoring element 362 to power controller 360 indicates that an operating temperature of power phase 342 has risen above a predetermined temperature threshold. Responsive to thermal monitoring element 362 indicating that an operating temperature of power phase 342 has risen above the predetermined temperature threshold, power controller 360 disables power phase 342 and enables power phase 352 to supplant or otherwise operationally replace power phase 342. Power phase 352 thus operates to supply a portion of the total current to SoC 310 which was originally supplied by now-disabled power phase 342. Power phase 342 is placed into a cool down phase but not yet into a pool of available dormant power phases.

At time T3 in FIG. 4, the operating temperature provided by thermal monitoring element 363 to power controller 360 indicates that an operating temperature of power phase 343 has fallen below the dormancy temperature threshold, indicating a cool down period has completed. Power controller 360 can bring power phase 343 into the pool of available dormant power phases.

At time T4 in FIG. 4, the operating temperature provided by thermal monitoring element 366 to power controller 360 indicates that an operating temperature of power phase 351 has risen above a predetermined temperature threshold. Responsive to thermal monitoring element 366 indicating that an operating temperature of power phase 351 has risen above the predetermined temperature threshold, power controller 360 disables power phase 351 and enables power phase 343 to supplant or otherwise operationally replace power phase 351. Power phase 343 thus operates to supply a portion of the total current to SoC 310 which was originally supplied by now-disabled power phase 351. Since power phase 343 had completed a cool down period, power phase 343 had been placed into the pool of available dormant power phases. Although any of the dormant power phases could be selected by power controller 360, for exemplary purposes power phase 343 is selected at T4. Power phase 351 is placed into a cool down phase but not yet into a pool of available dormant power phases.

At time T5 in FIG. 4, the operating temperature provided by thermal monitoring element 365 to power controller 360 indicates that an operating temperature of power phase 345 has risen above a predetermined temperature threshold. Responsive to thermal monitoring element 365 indicating that an operating temperature of power phase 345 has risen above the predetermined temperature threshold, power controller 360 enables power phase 353 to supplement power phase 345. Instead of disabling power phase 345, power controller 360 might elect to keep power phase 345 in an active state and activate power phase 353 concurrently. This has the effect of reducing the per-phase power supplied by each active power phase, since six power phases are now active instead of five.

This operation of adding power phases without disabling existing power phases exemplifies an alternative arrangement where additional power phases are brought into service to reduce per-phase current and thus per-phase temperature rise. Examples of when this alternative arrangement might be employed include when SoC 310 changes into a high-current or higher-power mode of operation which draws more current on average than previously. Since all power phases might experience an undesired temperature rise when SoC 310 draws more current on average, then additional power phases might be brought into operation from the pool of dormant power supply phases. Conversely, when SoC 310 changes into a low-current or low-power mode of operation, such as an idle or sleep mode, then one or more power phases might be eliminated from active service and placed to the cool down phase or dormancy phase until SoC 310 exceeds a threshold average current. The average current or average power can be sensed by power controller 360 directly by measurement of current supplied by each power phase, or indirectly by a temperature rise experienced across many or all active power phases.

In addition to the rotation of active/dormant power phases discussed above, a rotation among master/slave designations for power phases can also occur. Multiphase power supplies, such as power system 370, can have a master-slave relationship among the phases. In FIG. 3, such an arrangement might employ one of the active phases as a master, with the rest of the active phases supporting the load at link 374. Power system 370 can dynamically select a master phase on-demand based on thermal information, with the rest of the phases assigned as slave phases. Although this master phase might be selected dynamically based on a phase having a lowest temperature among the other phases, various other factors can be employed in this selection. Thus, a rotating master/slave arrangement between power phases might be concurrently present during rotation among active/dormant phases.

Alternative implementations of power system 370 and power controller 360 can be employed. These alternative implementations can be employed addition to or alternatively from monitoring temperatures or thermal properties of the power phases. In one example, a rotation among active/dormant power phases is performed based upon how long particular power phases have been active. In other words, a time-based swapping process can be implemented for bringing active phases out of service and bringing dormant power phases into service based on how long power phases have been active or inactive. This might balance out active in-service time periods to be roughly equal among all the phases. A periodicity can be selected relative to a thermal time constant of the power phases, which might vary based on implementations with or without heatsink or shared heatsinks. In this example, a power phase might reach an upper temperature threshold (indirectly calculated or empirically measured) in a given time period, such as 100 milliseconds (ms). If 'n' quantity of power phases are included and n−1 are active with one dormant, then all phases can be placed into an inactive state for (100 ms/'n') milliseconds on a rotating basis. In a specific example, if 7 power phases are included in a design with 6 active and one spare, then all phases can be placed into an inactive state for 14.3 ms on a rotating basis. In one example rotation cycle, the power phases might be rotated through every second (i.e. each phase is active for n−1 seconds and inactive for 1 second), then this example rotation cycle would not be effective, with devices heating up to their maximum temperature in 100 ms. Instead, a better rotation cycle can include rotating through the phases every 100/n ms (i.e. active for 100−(100/n) ms and off for 100/n ms) to ensure a consistent amount of thermal relief for each power phase within a meaningful period of time. The time for a power phase to reach an upper temperature threshold will vary based upon presence of a heat sink, and also will vary based upon the type of heatsink, as well as the efficiency of specific components that comprise the power phase. In general, longer time constants can be associated with heatsink solutions although the devices themselves can and will change temperature more quickly than the heatsink. The heatsink temperature represents a longer-term thermal average that will either be slowly rising if more heat is going into the heatsink than out of the heatsink, slowly falling if more heat is going out of the heatsink than into the heatsink, or staying stable if heat input and output are balanced for the heatsink.

Phase rotation can also be considered in situations where system operating conditions require lower power levels, such as when fewer total power phases may be active to affect total system power efficiency. In the situation as described above, phases are included for a full power load but only n−1 of them are required for a present power loading (i.e. one is dormant). However, consider the example where the power load is reduced such that only one power phase is required. This might occur when SoC 310 is in an idle mode or low power operating mode. Phase rotation can be used as described herein, either based upon thermal data, rotated based upon estimates/measurements of power consumed over time by each power phase, or rotated for equal time periods among all the power phases. These low power situations can be challenging for power phase operation, mainly because power phases tend to have reduced airflow due to the fact that the overall system is operating at a lower power level. Also, in cases where the power phases are operating without heatsinks, the power phases can heat up to higher temperature values more quickly. Without some type of airflow intervention, the reduced quantity of active power phases could reach higher temperatures than in a full power load case. Phase rotation, as described herein, would be beneficial for the active power phases. This low power level scenario might also occur when heatsinks are employed, depending upon what type of heatsink is employed and if the heatsink is shared with other components of computing system 300. In general, a larger shared heatsink would provide a reasonable configuration in such situations where the system power overall is lower. This is due in part to the heatsink, even with reduced airflow in a low power situation, is likely to have a significant surface area and amount of cooling capacity. However, large shared heatsink-based cooling configurations can be more expensive. Thus, the rotation among power phases can provide for smaller/cheaper heatsinks applied individually to devices, or no heatsinks at all in some cases.

In yet further examples, the rotation among power phases can be further enhanced based on physical proximity of power phases relative to each other. Selection of a dormant power phase to replace an active power phase can be made based upon a pattern of selection that isolates consecutive active power phases physically from each other. Consider an eight (8) phase case as described in FIG. 3, having each power phase (341-345 and 351-353) numbered according to the following sequence: 1-2-3-4-5-6-7-8. One example process is to rotate among the power phases in a 2, 5, 8, 3, 6, 1, 4, 7 pattern, or any other pattern, to reduce a likelihood that a newly activated power phase occurs too close to a neighboring power phase that was previously active. Even with situations where two or more power phases are concurrently employed as active power phases, an activation pattern might utilize active pairs that are not adjacent to one another at the same time (i.e. (2-5), (3-6), (4-7), (1-5), (2-6), (3-7), (1-4), etc. . . . ), or any number of other possible non-adjacent combinations. Selection among non-adjacent power phases can be made based in part on physical proximity on a shared circuit board to each other and to other components, alignment with regard to any associated airflow or venting, or existence/absence of shared heatsinks among the power phases, among other factors. This physical location information can be used in conjunction with any of the phase rotation processes described above, or to adjust relative active/inactive time periods among the power phases. For example, naturally warmer/hotter power phases due to physical positioning might be allocated a larger dormancy period than naturally cooler power phases. Characterization of naturally hotter or cooler power phases can be made in situ by monitoring temperatures or by estimations based on physical placement of the power phases.

In another example, physical position within a group of power phases can be considered. When a plurality of power phases is employed, these power phases might be positioned on a circuit board in a group or linear arrangement. Power phases which lie towards the center of the grouping or linear arrangement might experience higher operating temperatures than power phases on the exterior or perimeter of the grouping. A thermal weighting factor can be employed in the rotation among active/dormant power phases so that certain power phases might be used a percentage less frequently or more frequently. This thermal weighting corresponds to an expected temperature rise of dormant power supply phases once brought into service. For example, if a particular power phase is positioned in between two other power phases, this internally positioned power phase might experience higher operating temperatures or reach a threshold operating temperature faster when active and surrounded by other active power phases or power phases in a cooling/dormancy period. Thus, this internally positioned power phase might have a rotation weighting of 5% less than the power phases on the perimeter of the grouping. This is due in part to the power phases on the perimeter not having power phases adjacent on as many sides as the internally positioned power phase. Likewise, the perimeter power phases might have an increase rotation weighting of 5% more than the internally placed power phases, or any appropriate weighting to offset the weightings of the internally placed power phases. This weighting can refer to a duty cycle weighting, where the weighting can alter a duty cycle from a baseline value to ensure that all phases have a 100% duty cycle in the aggregate. Applying this weighting example to the situation where only one power phase is presently active, this weighting could be applied to the amount of time each power phase is active. For the situation where 'n' phases are active, this weighting could be inversely applied to the amount of time each phase is inactive (i.e. the cooler phases would be off for shorter periods of time and the warmer phases would be off for longer periods of time).

Figure 5:
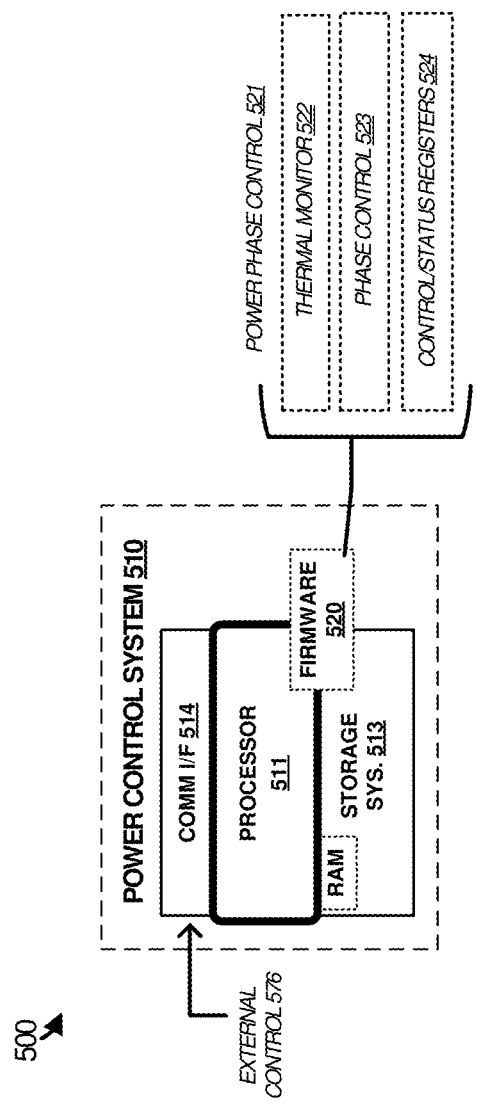
FIG. 5 illustrates an example control system suitable for implementing any of the architectures, platforms, processes, methods, and operational scenarios disclosed herein.

FIG. 5 illustrates power control system 510 that is representative of any system or collection of systems in which the various operational architectures, scenarios, and processes disclosed herein may be implemented. For example, power control system 510 can be used to implement power controller 131 of FIG. 1 or power controller 360 of FIG. 3. Examples of power control system 510 include, but are not limited to, processors, microprocessors, microcontrollers, programmable logic devices, application-specific integrated circuit devices, or discrete circuitry, as well as any other type of physical or virtual machine, and other computing systems and devices, as well as any variation or combination thereof.

Power control system 510 may be implemented as a single apparatus, system, or device or may be implemented in a distributed manner as multiple apparatuses, systems, or devices. Power control system 510 includes, but is not limited to, processor 511, storage system 513, communication interface system 514, and firmware 520. Processor 511 is operatively coupled with storage system 513 and communication interface system 514.

Processor 511 loads and executes firmware 520 from storage system 513. Firmware 520 includes power phase control 521, which is representative of the processes discussed with respect to the preceding Figures. When executed by processor 511 to enhance control and monitoring of power supply phases in a computing system power supply, firmware 520 directs processor 511 to operate as described herein for at least the various processes, operational scenarios, and sequences discussed in the foregoing implementations. Power control system 510 may optionally include additional devices, features, or functionality not discussed for purposes of brevity.

Referring still to FIG. 5, processor 511 may comprise a microprocessor and processing circuitry that retrieves and executes firmware 520 from storage system 513. Processor 511 may be implemented within a single processing device, but may also be distributed across multiple processing devices, sub-systems, or specialized circuitry, that cooperate in executing program instructions and in performing the operations discussed herein. Examples of processor 511 include general purpose central processing units, application specific processors, and logic devices, as well as any other type of processing device, combinations, or variations thereof.

Storage system 513 may comprise any computer readable storage media readable by processor 511 and capable of storing firmware 520. Storage system 513 may include volatile and nonvolatile, removable and non-removable media implemented in any method or technology for storage of information, such as computer readable instructions, data structures, program modules, or other data. Examples of storage media include random access memory (RAM), read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 513 may also include computer readable communication media over which at least some of firmware 520 may be communicated internally or externally. Storage system 513 may be implemented as a single storage device, but may also be implemented across multiple storage devices or sub-systems co-located or distributed relative to each other. Storage system 513 may comprise additional elements, such as a controller, capable of communicating with processor 511 or possibly other systems.

Firmware 520 may be implemented in program instructions and among other functions may, when executed by processor 511, direct processor 511 to operate as described with respect to the various operational scenarios, sequences, and processes illustrated herein. For example, firmware 520 may include program instructions for enhanced control and monitoring of power supply phases in a computing system power supply, among other operations.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Firmware 520 may include additional processes, programs, or components, such as operating system software or other application software, in addition to that of power phase control 521. Firmware 520 may also comprise software or some other form of machine-readable processing instructions executable by processor 511.

In general, firmware 520 may, when loaded into processor 511 and executed, transform a suitable apparatus, system, or device (of which power control system 510 is representative) overall from a general-purpose computing system into a special-purpose computing system customized to facilitate enhanced control and monitoring of power supply phases in a computing system power supply. Indeed, encoding firmware 520 on storage system 513 may transform the physical structure of storage system 513. The specific transformation of the physical structure may depend on various factors in different implementations of this description. Examples of such factors may include, but are not limited to, the technology used to implement the storage media of storage system 513 and whether the computer-storage media are characterized as primary or secondary storage, as well as other factors.

For example, if the computer readable storage media are implemented as semiconductor-based memory, firmware 520 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Power phase control 521 can include one or more software elements, such as an operating system, devices drivers, and one or more applications. These elements can describe various portions of power control system 510 with which power electronics, temperature monitoring circuitry, control nodes, or other elements interact. For example, an operating system can provide a software platform on which power phase control 521 is executed and allows for enhanced control of power supply circuitry, among other operations.

In one example, thermal monitor 522 can monitor thermal properties of a plurality of power supply phases. Thermal monitor 522 can also interface with any associated thermal monitoring circuitry or thermal sensors to retrieve thermal properties of the plurality of power supply phases. Thermal monitor 522 can monitor the thermal properties by at least determining operating temperatures for components for each of the plurality of power supply phases, and comparing the operating temperatures to a thermal threshold.

In another example, phase control 523 can control active/inactive modes of the plurality of power supply phases. Responsive to thermal properties indicating at least one of the plurality of power supply phases exceeds a thermal threshold, phase control 523 can select a dormant power supply phase to supplement the plurality of power supply phases. Phase control 523 can control supplementing the plurality of power supply phases by disabling the at least one of the plurality of power supply phases and enabling a selected dormant power supply phase. Phase control 523 can control supplementing the plurality of power supply phases by enabling a selected dormant power supply phase while the at least one of the plurality of power supply phases remains operational to reduce a per-phase current handled by the plurality of power supply phases. Phase control 523 can control place ones of the plurality of power supply phases into a pool of dormant power supply phases from which supplemental power supply phases are selected.

Phase control 523 can control selection of a dormant power supply phase from a pool of dormant power supply phases as having a corresponding temperature below a dormancy temperature threshold. Phase control 523 can control selection of the dormant power supply phase from a plurality of dormant power supply phases based on present temperatures of ones of the plurality of dormant power supply phases.

In a further example, control/status registers 524 can provide for control and status registers through which an external system can interact with elements of power control system 510 over external control 576. Control/status registers 524 might indicate current thermal properties of a plurality of power supply phases. Control/status registers 524 might indicate active/inactive status of a plurality of power supply phases. Control/status registers 524 might indicate present voltage levels or current levels provided by a plurality of power supply phases. Control/status registers 524 might provide for control via external control 576 to indicate which of a plurality of power supply phases should be in a dormant or active state, or which of a plurality of power supply phases can be rotated among according to the operations discussed herein.

Communication interface system 514 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange packetized communications with other computing systems or networks of systems, such as metal, glass, air, or any other suitable communication media. Communication interface system 514 may include user interface elements, such as programming registers, status registers, control registers, APIs, or other user-facing control and status elements. These user interface elements can comprise portions of control/status registers 524 or communication interfaces for user access to control/status registers 524.

Communication between power control system 510 and other computing systems (not shown), may occur over a communication network or networks and in accordance with various communication protocols, combinations of protocols, or variations thereof. Communication interfaces might comprise system management bus (SMB) interfaces, inter-integrated circuit (I2C) interfaces, or other similar interfaces. Further examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A method comprising powering a circuit with a plurality of power supply phases, and monitoring thermal properties of the plurality of power supply phases. Responsive to the thermal properties indicating at least one of the plurality of power supply phases exceeds a thermal threshold, the method includes selecting a dormant power supply phase to supplement the plurality of power supply phases.

Example 2

The method of Example 1, further comprising supplementing the plurality of power supply phases by disabling the at least one of the plurality of power supply phases and enabling a selected dormant power supply phase.

Example 3

The method of Examples 1-2, further comprising responsive to disabling the at least one of the plurality of power supply phases, placing the at least one of the plurality of power supply phases into a pool of dormant power supply phases from which the dormant power supply phase is selected.

Example 4

The method of Examples 1-3, further comprising supplementing the plurality of power supply phases by enabling a selected dormant power supply phase while the at least one of the plurality of power supply phases remains operational to reduce a per-phase current handled by the plurality of power supply phases.

Example 5

The method of Examples 1-4, where the plurality of power supply phases each comprise power conversion circuitry configured to provide a portion of a total current supplied to the circuit.

Example 6

The method of Examples 1-5, further comprising monitoring the thermal properties by at least determining operating temperatures for components for each of the plurality of power supply phases, and comparing the operating temperatures to the thermal threshold.

Example 7

The method of Examples 1-6, further comprising selecting the dormant power supply phase from a pool of dormant power supply phases as having a corresponding temperature below a dormancy temperature threshold or having been dormant for a corresponding dormancy period.

Example 8

The method of Examples 1-7, further comprising selecting the dormant power supply phase from a plurality of dormant power supply phases based on one or more factors comprising present temperatures of ones of the plurality of dormant power supply phases, positions relative to the at least one of the plurality of power supply phases, and thermal weighting corresponding to expected temperature rise of the ones of the plurality of dormant power supply phases.

Example 9

An apparatus comprising one or more computer readable storage media and program instructions stored on the one or more computer readable storage media. Based at least in part on execution by a control system, the program instructions direct the control system to at least instruct a plurality of power supply phases to supply power to a circuit, and monitor thermal properties of the plurality of power supply phases. Responsive to the thermal properties indicating at least one of the plurality of power supply phases exceeds a thermal threshold, the program instructions direct the control system to at least select a dormant power supply phase to supplement the plurality of power supply phases.

Example 10

The apparatus of Example 9, comprising further program instructions, based at least in part on execution by the control system, direct the control system to at least supplement the plurality of power supply phases by disabling the at least one of the plurality of power supply phases and enabling a selected dormant power supply phase.

Example 11

The apparatus of Examples 9-10, comprising further program instructions, based at least in part on execution by the control system, direct the control system to at least responsive to disabling the at least one of the plurality of power supply phases, place the at least one of the plurality of power supply phases into a pool of dormant power supply phases from which the dormant power supply phase is selected.

Example 12

The apparatus of Examples 9-11, comprising further program instructions, based at least in part on execution by the control system, direct the control system to at least supplement the plurality of power supply phases by enabling a selected dormant power supply phase while the at least one of the plurality of power supply phases remains operational to reduce a per-phase current handled by the plurality of power supply phases.

Example 13

The apparatus of Examples 9-12, where the plurality of power supply phases each comprise power conversion circuitry configured to provide a portion of a total current supplied to the circuit.

Example 14

The apparatus of Examples 9-13, comprising further program instructions, based at least in part on execution by the control system, direct the control system to at least monitor the thermal properties by at least determining operating temperatures for components for each of the plurality of power supply phases, and compare the operating temperatures to the thermal threshold.

Example 15

The apparatus of Examples 9-14, comprising further program instructions, based at least in part on execution by the control system, direct the control system to at least select the dormant power supply phase from a pool of dormant power supply phases as having a corresponding temperature below a dormancy temperature threshold or having been dormant for a corresponding dormancy period.

Example 16

The apparatus of Examples 9-15, comprising further program instructions, based at least in part on execution by the control system, direct the control system to at least select the dormant power supply phase from a plurality of dormant power supply phases based on one or more factors comprising present temperatures of ones of the plurality of dormant power supply phases, positions relative to the at least one of the plurality of power supply phases, and thermal weighting corresponding to expected temperature rise of the ones of the plurality of dormant power supply phases.

Example 17

A power supply system, comprising a plurality of power supply phases configured to provide power to an integrated circuit device, and a control system configured to selectively enable one or more additional power supply phases based at least on monitored temperatures associated with each of the plurality of power supply phases.

Example 18

The power supply system of Example 17, comprising the control system configured to maintain a pool of inactive power supply phases and select the one or more additional power supply phases from the pool.

Example 19

The power supply system of Examples 17-18, comprising the control system configured to determine that at least one of the plurality of power supply phases has exceeded a temperature threshold, and responsively disable the at least one of the plurality of power supply phases and enable the one or more additional power supply phases. The control system also is configured to place the at least one of the plurality of power supply phases into the pool of inactive power supply phases from which the one or more additional power supply phases is selected.

Example 20

The power supply system of Examples 17-19, comprising the control system configured to supplement the plurality of power supply phases by enabling the one or more additional power supply phases while the at least one of the plurality of power supply phases remains operational to reduce a per-phase current handled by the plurality of power supply phases.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
powering a circuit with a plurality of power supply phases;
monitoring thermal properties of the plurality of power supply phases;
responsive to the thermal properties indicating at least one of the plurality of power supply phases exceeds a thermal threshold, selecting a dormant power supply phase to operationally replace the at least one of the plurality of power supply phases;
enabling the dormant power supply phase;
disabling the at least one of the plurality of power supply phases after enabling the dormant power supply phase; and
responsive to disabling the at least one of the plurality of power supply phases, placing the at least one of the plurality of power supply phases into a pool of dormant power supply phases from which the dormant power supply phase is selected.

2. The method of claim 1, further comprising:
operationally replacing the at least one of the plurality of power supply phases by enabling the dormant power supply phase while the at least one of the plurality of power supply phases remains operational to reduce a per-phase current handled by the plurality of power supply phases.

3. The method of claim 1, wherein the plurality of power supply phases each comprise power conversion circuitry configured to provide a portion of a total current supplied to the circuit.

4. The method of claim 1, further comprising:
monitoring the thermal properties by at least determining operating temperatures for components for each of the plurality of power supply phases, and comparing the operating temperatures to the thermal threshold.

5. The method of claim 1, further comprising:
selecting the dormant power supply phase from the pool of dormant power supply phases as having a corresponding temperature below a dormancy temperature threshold or having been dormant for a corresponding dormancy period.

6. The method of claim 1, further comprising:
selecting the dormant power supply phase from the pool of dormant power supply phases based on one or more factors comprising present temperatures of ones of the pool of dormant power supply phases, positions relative to the at least one of the pool of power supply phases, and thermal weighting corresponding to expected temperature rise of the ones of the pool of dormant power supply phases.

7. An apparatus comprising:
one or more non-transitory computer readable storage media;
program instructions stored on the one or more non-transitory computer readable storage media that, based at least in part on execution by a control system, direct the control system to at least:
instruct a plurality of power supply phases to supply power to a circuit;
monitor thermal properties of the plurality of power supply phases;
responsive to the thermal properties indicating at least one of the plurality of power supply phases exceeds a thermal threshold, select a dormant power supply phase to operationally replace the at least one of the plurality of power supply phases;
enable the dormant power supply phase;
disable the at least one of the plurality of power supply phases after enabling the dormant power supply phase; and
responsive to disabling the at least one of the plurality of power supply phases, place the at least one of the plurality of power supply phases into a pool of dormant power supply phases from which the dormant power supply phase is selected.

8. The apparatus of claim 7, comprising further program instructions, based at least in part on execution by the control system, direct the control system to at least:
operationally replace the at least one of the plurality of power supply phases by enabling the dormant power supply phase while the at least one of the plurality of power supply phases remains operational to reduce a per-phase current handled by the plurality of power supply phases.

9. The apparatus of claim 7, wherein the plurality of power supply phases each comprise power conversion circuitry configured to provide a portion of a total current supplied to the circuit.

10. The apparatus of claim 7, comprising further program instructions, based at least in part on execution by the control system, direct the control system to at least:
monitor the thermal properties by at least determining operating temperatures for components for each of the plurality of power supply phases, and compare the operating temperatures to the thermal threshold.

11. The apparatus of claim 7, comprising further program instructions, based at least in part on execution by the control system, direct the control system to at least:
select the dormant power supply phase from the pool of dormant power supply phases as having a corresponding temperature below a dormancy temperature threshold or having been dormant for a corresponding dormancy period.

12. The apparatus of claim 7, comprising further program instructions, based at least in part on execution by the control system, direct the control system to at least:
select the dormant power supply phase from the pool of dormant power supply phases based on one or more factors comprising present temperatures of ones of the pool of dormant power supply phases, positions relative to the at least one of the pool of power supply phases, and thermal weighting corresponding to expected temperature rise of the ones of the pool of dormant power supply phases.

13. A power supply system, comprising:
a plurality of power supply phases configured to provide power to an integrated circuit device; and
a control system configured to:
maintain a pool of inactive power supply phases;
selectively enable one or more additional power supply phases from the pool to operationally replace at least one of the plurality of power supply phases based at least on monitored temperatures associated with the at least one of the plurality of power supply phases; and
disable the at least one of the plurality of power supply phases after enabling the one or more additional power supply phases; and
place the at least one of the plurality of power supply phases into the pool of inactive power supply phases from which the one or more additional power supply phases is selected.

14. The power supply system of claim 13, comprising:
the control system configured to determine that the at least one of the plurality of power supply phases has exceeded a temperature threshold, and responsively disable the at least one of the plurality of power supply phases and enable the one or more additional power supply phases.

15. The power supply system of claim 13, comprising:
the control system configured to supplement the plurality of power supply phases by enabling the one or more additional power supply phases while the at least one of the plurality of power supply phases remains operational to reduce a per-phase current handled by the plurality of power supply phases.

* * * * *